(12) United States Patent
Bush et al.

(10) Patent No.: US 6,199,948 B1
(45) Date of Patent: Mar. 13, 2001

(54) INTERCHANGEABLE MODULE SYSTEM

(75) Inventors: Neil J. Bush, Pinckney; Daniel J. Koester, Ann Arbor; William J. Fluharty, Holland, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/212,806

(22) Filed: Dec. 16, 1998

(51) Int. Cl.⁷ ..................................... A47C 31/00
(52) U.S. Cl. .................. 297/217.3; 297/440.14; 297/188.04
(58) Field of Search ............... 297/217.1, 217.3, 297/217.4, 188.01, 188.04, 188.2, 463.2, 230.1, 230.13, 440.14, 238, 237, 112, 113, 378.1

(56) References Cited

U.S. PATENT DOCUMENTS

| | | | |
|---|---|---|---|
| 2,481,943 | * | 9/1949 | Murphy et al. . |
| 3,019,050 | * | 1/1962 | Spielman . |
| 3,999,014 | * | 12/1976 | Bascom . |
| 4,602,358 | * | 7/1986 | Sato . |
| 4,868,888 | * | 9/1989 | Dayton . |
| 5,106,159 | * | 4/1992 | Iwamoto . |
| 5,147,109 | * | 9/1992 | Jolly . |
| 5,267,775 | * | 12/1993 | Nguyen . |
| 5,292,174 | * | 3/1994 | Ohnuma . |
| 5,482,352 | * | 1/1996 | Leal et al. . |
| 5,609,382 | | 3/1997 | Schmid et al. . |
| 5,624,156 | * | 4/1997 | Leal et al. . |
| 5,628,543 | * | 5/1997 | Filipovich et al. . |
| 5,713,633 | * | 2/1998 | Lu . |
| 5,865,503 | * | 2/1999 | Shields, Jr. . |
| 5,911,470 | * | 6/1999 | Aumond . |
| 5,913,533 | * | 6/1999 | Lucas, Jr. et al. . |

* cited by examiner

Primary Examiner—Milton Nelson, Jr.
(74) Attorney, Agent, or Firm—Foley & Lardner

(57) ABSTRACT

A seat assembly of a vehicle capable of receiving and retaining an interchangeable module. The seat assembly includes a seat bottom, a seat back, and a module receiver. The module receiver is secured to either the seat bottom or the seat back and includes a coupling device to retain the module which is received in the module receiver.

25 Claims, 11 Drawing Sheets

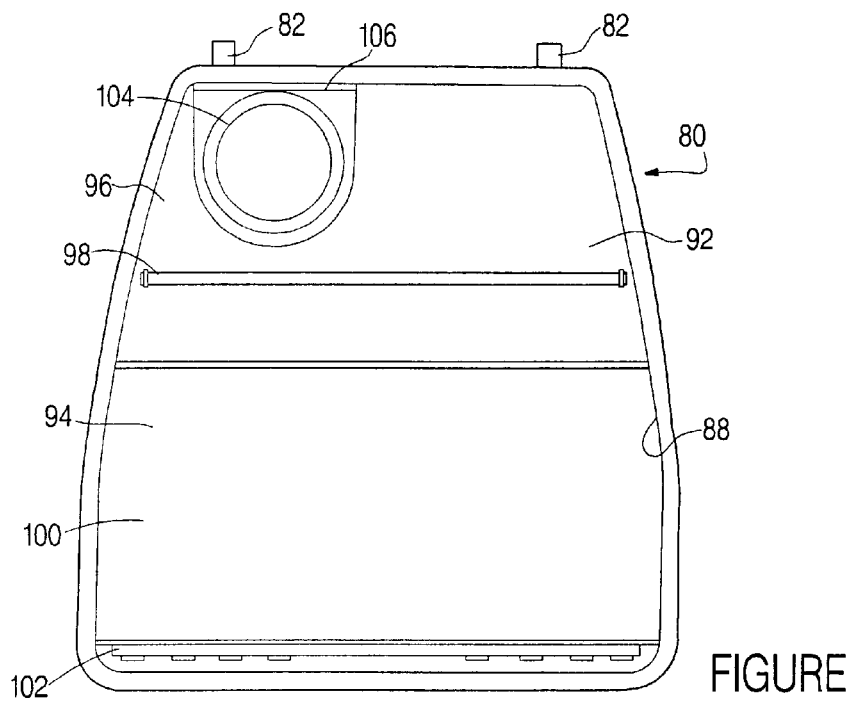
FIGURE 10
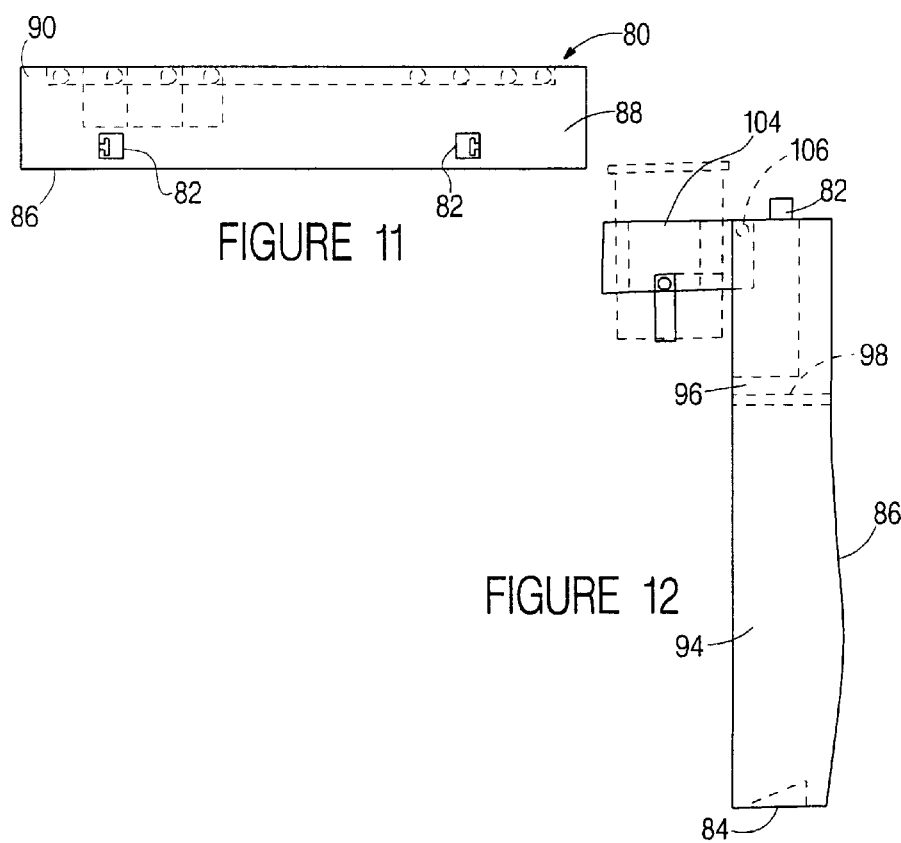
FIGURE 11
FIGURE 12

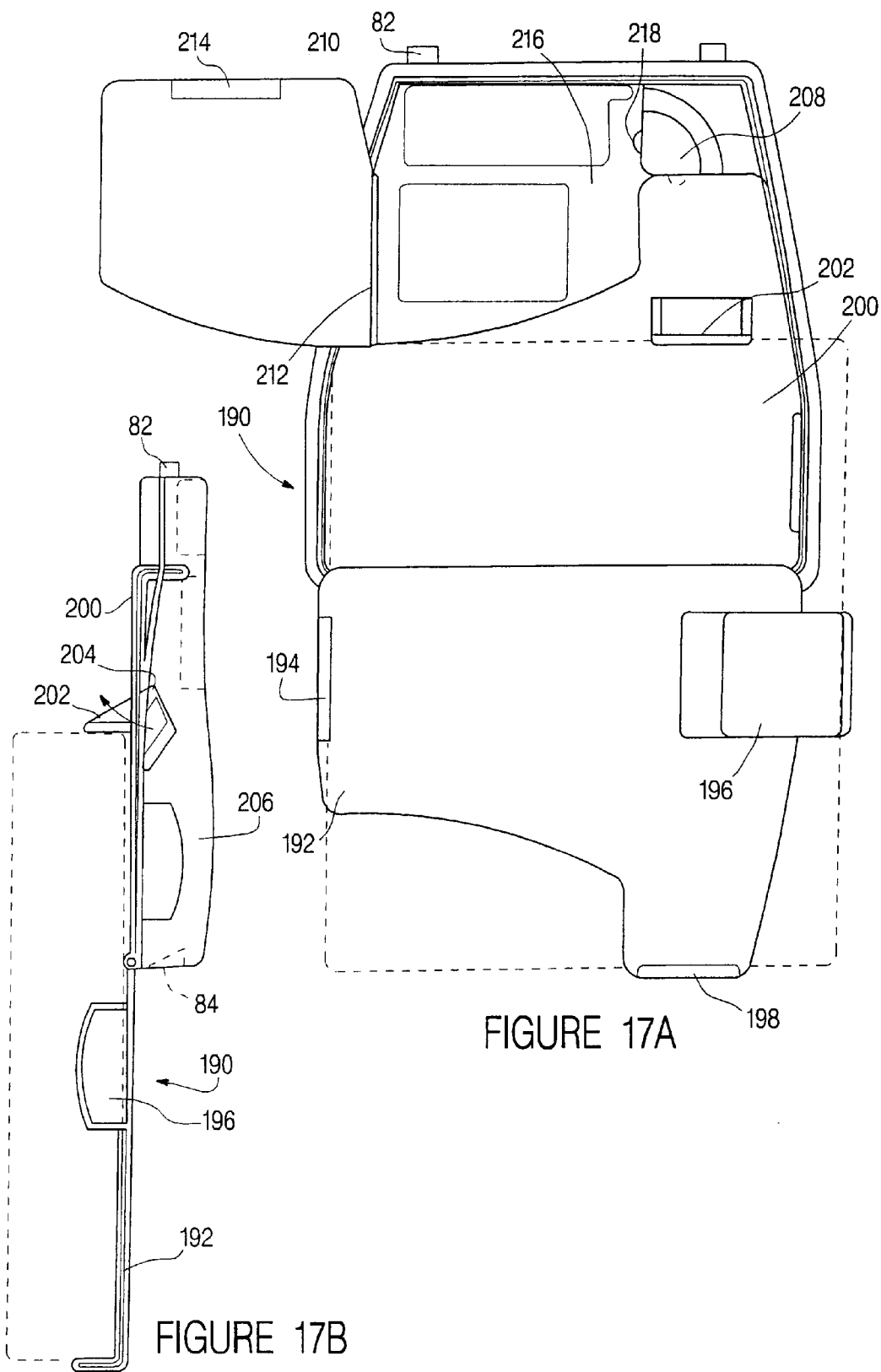

INTERCHANGEABLE MODULE SYSTEM

BACKGROUND OF THE INVENTION

This invention generally relates to an interchangeable module system and, more particularly, to a system having a module receiver which can receive a wide variety of interchangeable modules.

Consumers are increasingly using their vehicles for purposes other than simply going from one place to another. With the ever increasing use of cellular phones and lap top computers, many people are conducting business from their vehicles. While automotive manufacturers are providing more power outlets for such devices, there is currently a need within the industry to provide adequate and convenient storage and work surfaces within the vehicle to properly utilize these tools of business. Presently, most surfaces that are available are temporarily attached to either the windshield or instrument panel by suction cups or hook and loop fasteners. Further, many mobile office users improvise support surfaces by placing a briefcase or notebook on the seat cushion.

These piecemeal and improvised solutions to the problem of providing an adequate work surface within the vehicle often fail to position the work surface in a convenient location and do not provide solid surfaces upon which a significant amount of work can be conducted. Further, each of these solutions fails to provide adequate and secure storage for the files, computers, or other items which are regularly used by people conducting business from their vehicles.

While some people use their vehicles for work purposes, others find themselves having long commutes or hurried schedules which require the driver or passengers to eat a meal while in transit. As with the business oriented use of the vehicle, people often improvise support surfaces and beverage holders when eating and commuting at the same time. Again, many of these improvised solutions fail to fully solve the problems encountered.

An even more perplexing problem is encountered when the vehicle is used during the week as a make shift office and on the weekend for a family get away. The pieces and parts which have been used to make a working surface must now be removed and reinstalled when the need for the office once again arises.

SUMMARY OF THE INVENTION

In accordance with the teachings of the present invention, an interchangeable modular system is disclosed which provides quick and easy interchangeability of different modules, or the convenient storage of any particular module which is utilized. The system provides conveniences which can be readily utilized for personal, non-business type uses during personal or family travel and, by removing one module and inserting a different module, can provide an appropriate work related system including power and communications links.

The system provides a module receiver which is secured to the vehicle at a convenient and appropriate location. The module receiver includes a coupling device which retains the selected module to the module receiver. In one preferred embodiment, the receiver is secured to the rear surface of a seat back which can be folded from a generally upright position when used by a seated occupant to a generally horizontal position providing access to the module by a vehicle occupant. Depending upon the particular module which is being used at the time, the module can be functional when the seat back is in the upright position only, the upright or folded position, or in the folded position only.

The modules can include, but are not limited to, connections for power to any devices used with it, cellular phone connections, computer modem connections, and lights to illuminate the work surfaces or storage areas within or around the module. Further, the modules can at times be removed from and used independent of the module receiver, such as a backpack which can be removed and taken along with the occupant when they leave the vehicle. As will become apparent from the following description, there is little or no limit on the flexibility of uses or configurations of the modules. Additionally, the present invention allows for convenient interchangeability of new modules as they are developed to meet the needs of people as they use their vehicles in more and different ways.

BRIEF DESCRIPTION OF THE DRAWINGS

The various advantages of the present invention will become apparent to one skilled in the art upon reading the following specification and by reference to the drawings which include:

FIG. 10 is a plan view of a module made in accordance with the present invention;

FIG. 11 is a rear view of the module shown in FIG. 10;

FIG. 12 is a side view of the module of FIG. 10;

FIG. 17 are a plan and a side view of a brief case support module of the present invention.

DETAILED DESCRIPTION OF THE PREFERRED EMBODIMENTS

The following description of the preferred embodiments is merely exemplary in nature and is in no way intended to limit the invention, or its application, or uses.

Figure 1:
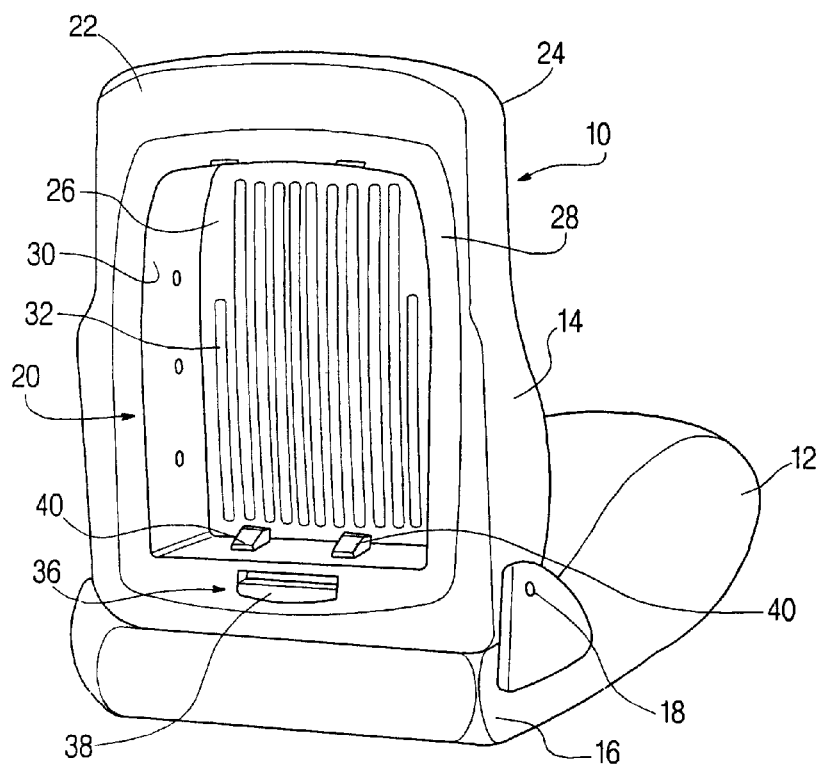
FIG. 1 is a rear perspective view of a seat containing a module receiver made in accordance with the teachings of the present invention.
Figure 2:
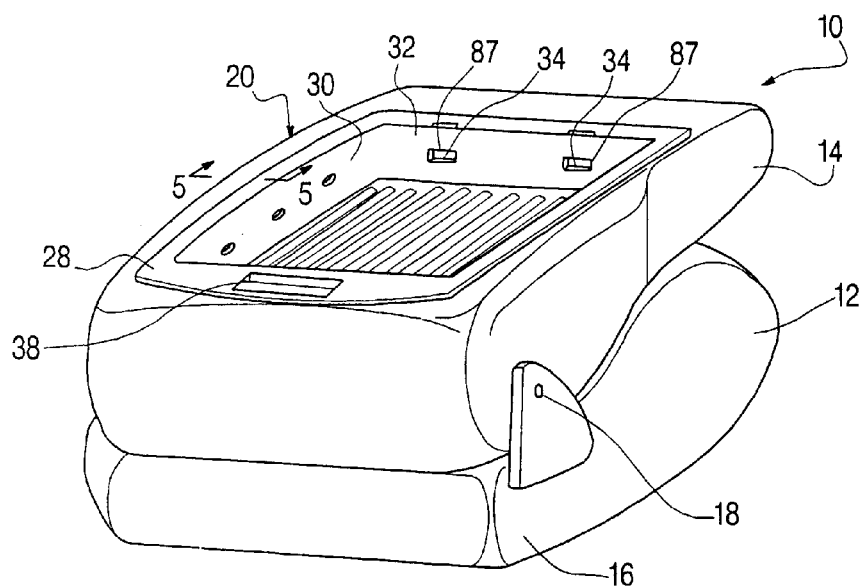
FIG. 2 is a rear perspective view of the seat in FIG. 1 wherein the seat back is folded forward to a generally horizontal position.

Referring to FIGS. 1 and 2, there is shown a seat 10 having a seat bottom 12 and a seat back 14. Seat back 14 extends in a generally upward direction from a rear end 16 of seat bottom 12. Seat back 14 can rotate about a pivot axis 18 from a generally upright seating position (shown in FIG. 1) to a substantially horizontal module use position (shown in FIG. 2). While the preferred embodiment of the present invention will be shown incorporated in a single occupant or bucket seat, other known seating systems such as fixed seats, bench seats, and split bench seats can be utilized with equal results.

A module receiver 20 is shown secured to the seat back 14. Module receiver 20 is shown to engage a second surface 22 of seat back 14. The first surface 24 of seat back 14 is used to support an occupant when in the seated position. First surface 24 and second surface 22 need not be parallel to one another, but are generally considered to be opposite surfaces from one another.

Module receiver 20 includes a receiver interface surface 26, a peripheral trim portion 28, and a side wall 30 extending between the receiver interface surface 26 and peripheral trim portion 28. Trim portion 28 of the preferred embodiment is shown to be coincident with the second surface 22 of seat back 14. Receiver interface surface 26 is offset from the second surface 22 and trim portion 28 such that a recess 32 is formed by side wall 30. While the preferred embodiment is shown to create a recess 32, interface surface 26 can be coplanar with trim portion 28 or can be raised above trim portion 28 thereby creating a raised section (not shown).

A device for coupling a module with module receiver 20 is shown to include apertures 34 and latch assembly 36. Latch assembly 36 includes release handle 38 and latch members 40. One skilled in the art will readily recognize that the coupling device utilized in module receiver 20 can take a wide variety of forms depending upon the geometric configuration, packaging, and load constraints placed on the particular application of the present invention.

Figure 3:
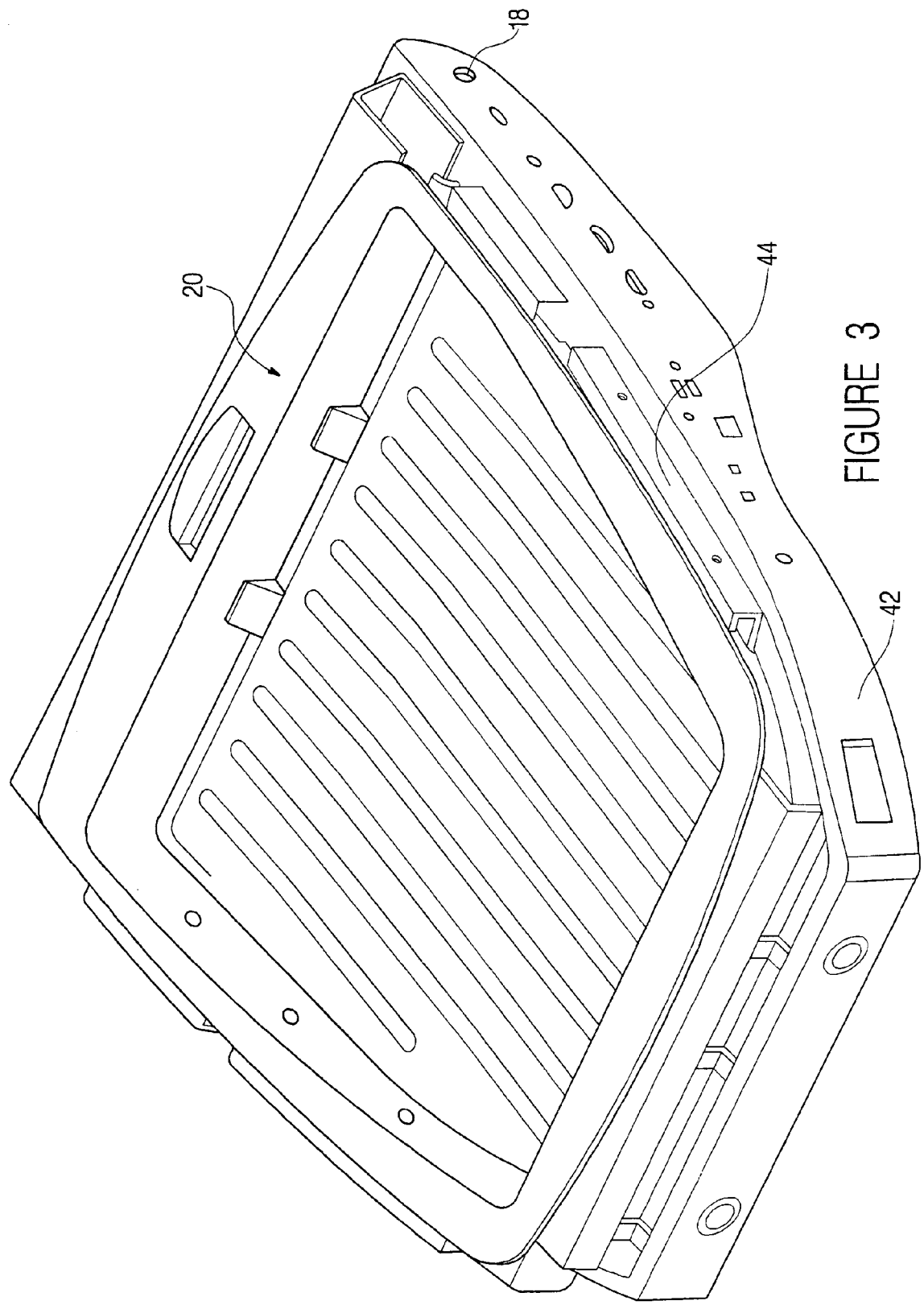
FIG. 3 is a perspective view of a seat back frame having a module receiver made in accordance with the present invention attached thereto.
Figure 4:
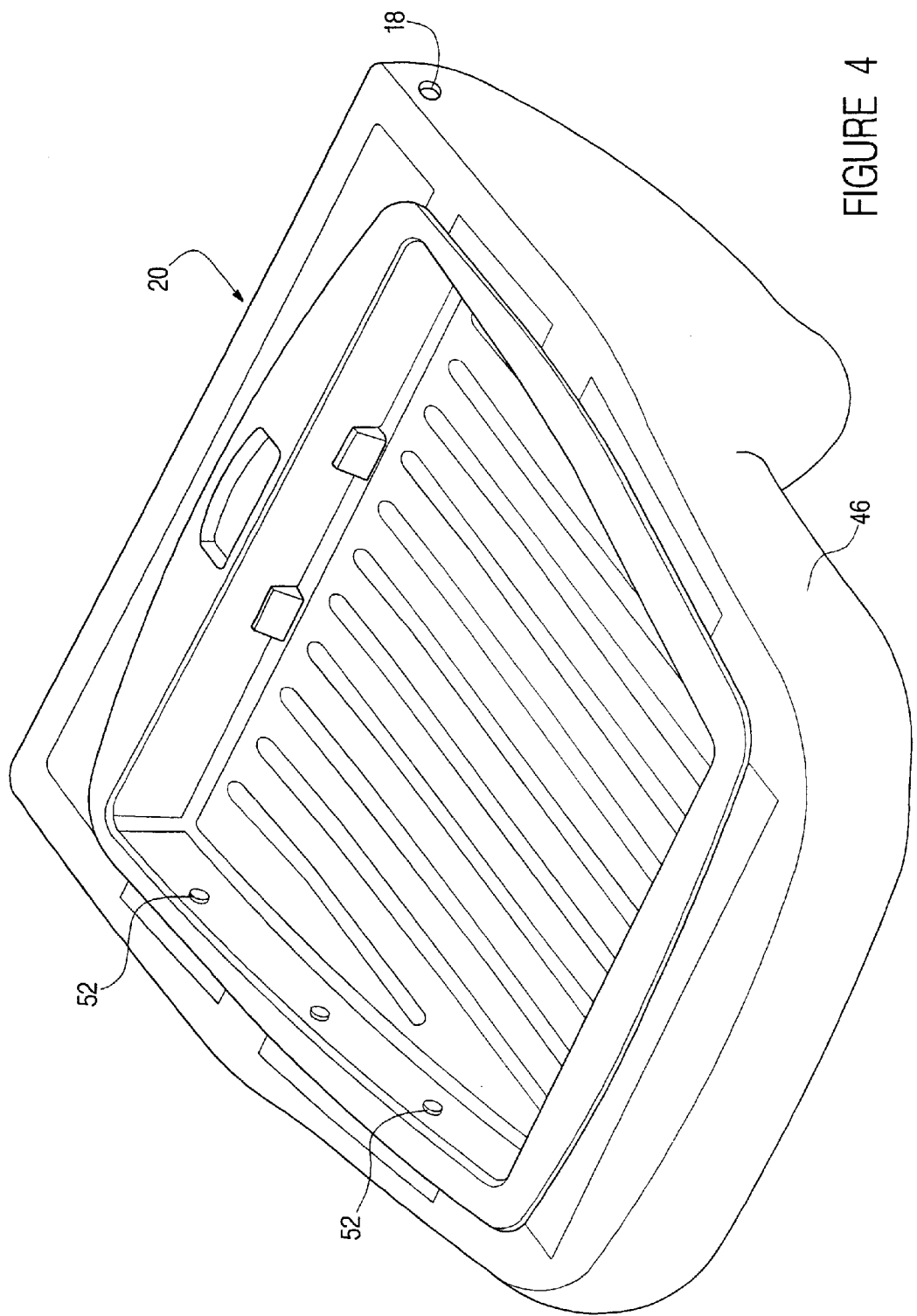
FIG. 4 is a perspective view similar to FIG. 3 additionally incorporating the seat back foam.
Figure 5:
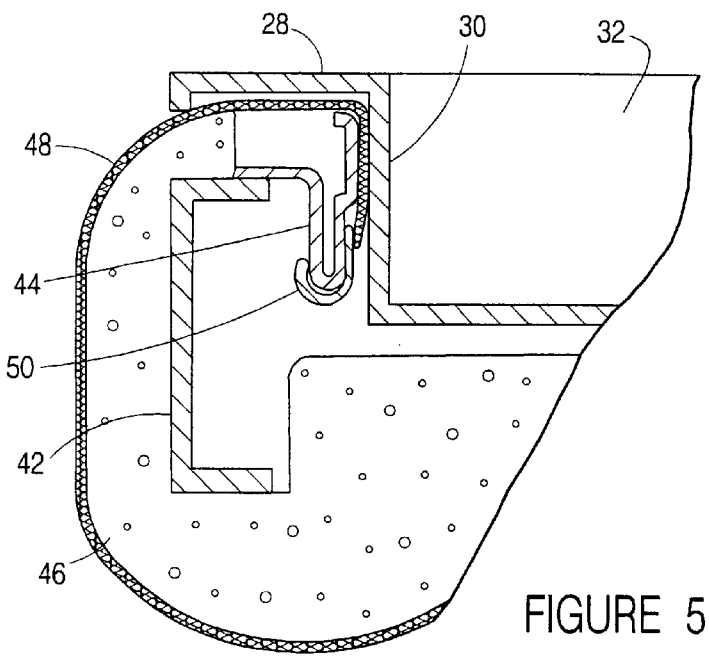
FIG. 5 is a sectional view taken along line 5—5 in FIG. 2.

Referring now to FIGS. 3, 4, and 5, the seat back frame 42 includes an attachment bracket 44 connected to or formed as part of frame 42. Attachment bracket 44 is used to secure module receiver 20 to the seat back 14 in the present embodiment. FIGS. 3 and 4 show the progressive steps of providing the seat back frame 42 and the subsequent addition of the seat back foam 46 which is typically covered by a cloth, leather, or vinyl material 48. In the preferred embodiment, module receiver 20 would not be installed and secured to seat back frame 42 by means of attachment bracket 44 until after material 48 has been properly installed. Module receiver 20 is shown simply as illustrative of the final installed position in FIGS. 3 and 4.

As best shown in FIG. 5, a J-clip 50 or some other fastening device is used to secure material 48 to attachment bracket 44 thereby securing the location of the foam and providing an appropriate aesthetic and tactile feel for the seat. Module receiver 20 is then positioned and secured to attachment bracket 44 by fasteners 52 (shown in FIG. 4).

Figure 6:
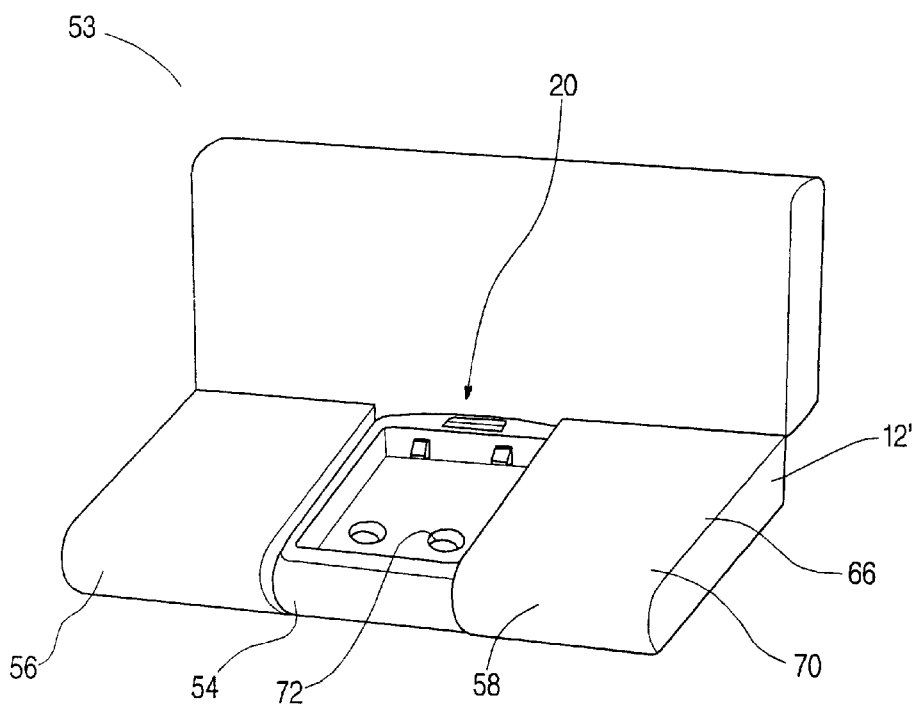
FIG. 6 is a perspective view of a seat containing the module receiver of the present invention secured to a seat bottom.

Referring to FIG. 6, there is shown another preferred embodiment for utilizing and locating module receiver 20 within a vehicle 53. Module receiver 20 is secured to a seat bottom 12' as shown. Seat bottom 12' is a bench seat having a center seating position 54 and outboard seating positions 56 and 58.

Figure 7:
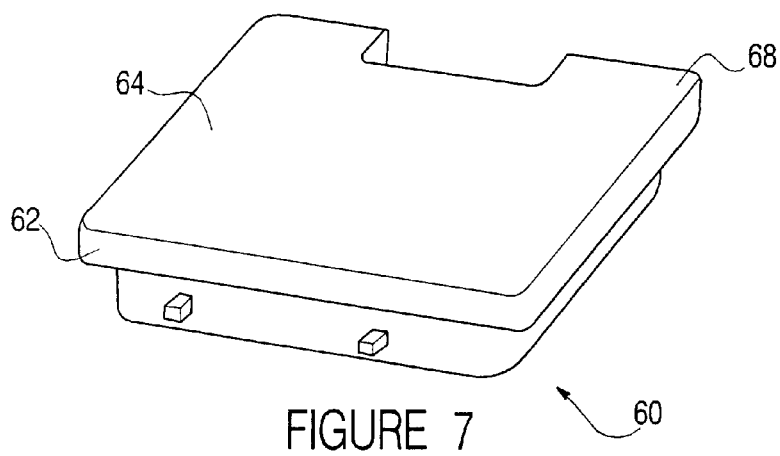
FIG. 7 is a perspective view of a padded module made in accordance with the teachings of the present invention for use with the module receiver of FIG. 6.
Figure 8:
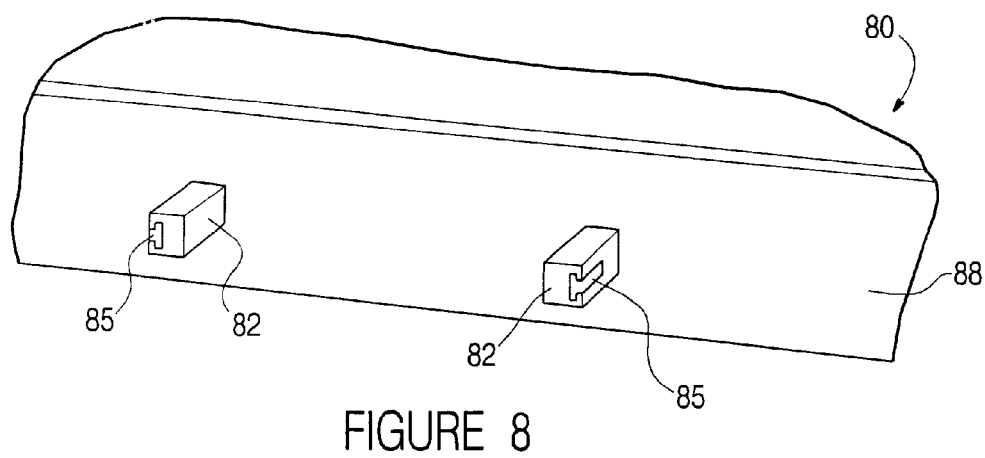
FIG. 8 is a detailed view of the projections incorporated in the module shown in FIG. 10.
Figure 9:
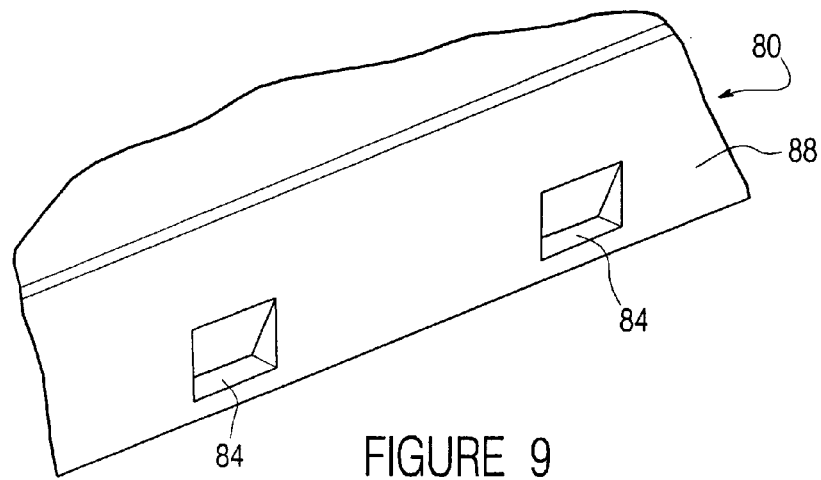
FIG. 9 is a detailed view of the catch formations incorporated in the module shown in FIG. 10.

With additional reference to FIG. 7, a module 60 is shown which can be used in conjunction with module receiver 20 when located as shown in FIG. 6. Module 60 of the present embodiment includes a pad 62 covered by a material 64 matching or complementing seat bottom material 66. Module 60 can be installed in module receiver 20 (as will be described below) when a center occupant will be seated in center seating position 54. Module 60 preferably provides a seating surface 68 which is the same height as seating surface 70 of outboard seating positions 56 and 58. This is accomplished by recessing module receiver 20 by an amount sufficient to provide padding thick enough to ensure the comfort of the occupant. When a center occupant will not be seated in the center seating position 54, module 60 can be removed and replaced by any of a number of other interchangeable modules described below. This interchangeability will allow occupants seated in outboard seating positions 56 and/or 58 to insert a module which will provide the appropriate amenities during their commute or travels. Further, module receiver 20 itself can have beneficial attributes such as providing a solid surface on which to rest an object which may damage the fabric of the seat or can have a cup holder or other shaped depression 72 formed in the receiver interface surface 26 thereby providing some utility even when no module is inserted in module receiver 20.

While the preferred embodiments described thus far have been shown to be incorporated in a seat assembly, the interchangeable module system of the present invention can be utilized in other locations within a vehicle. Specifically, the module receiver 20 can be secured to and utilized with: a fold down armrest incorporated in a seat assembly; a body side trim panel; a fixed or removable package shelf; a headliner assembly; and the floor pan, body side structure, or roof structure of a vehicle. The flexibility of locating module receiver 20 in the above locations allows the interchangeable module system of the present invention to provide a wide variety of use and/or storage locations for any particular module which a vehicle user may have. For example, one or more module receivers may be secured to a body side trim panel in a minivan so that several removable tote bag modules (described below) can be used by the occupants during a commute. Upon reaching the destination, the occupants could quickly and conveniently remove the tote bag modules and use them as with any other tote bag or back pack.

Referring to FIGS. 8–12, a base module 80 will be shown in detail to disclose some particular features which are common to all of the modules shown herein as related to the present invention. Particularly, module 80 shows the projections 82 which coordinate with and engage apertures 34 (FIG. 2), and formations 84 which are coordinated with latch members 40 of latch assembly 36 (FIG. 1). Apertures 34 and latch assembly 36 jointly act as a coupling device which can releasably retain module 80 by interfacing with and retaining projections 82 and formations 84. Contacts 85 located on the projections 82 provide an electrical connection between the module 80 and the module receiver 20. Coordinated electrical contacts 87 are located within seat back 14 and align with apertures 34 to provide electrical or electronic flow of power or information between the vehicle electrical system and the module or any components within the module. Coordinated electrical contacts 87 may be attached to the seatback 14 or to module receiver 20 depending on the particular application. While two contacts 85 are shown in the preferred embodiment, multiple contacts can be located on either or both projections to provide multiple connections to the vehicle system. The term electrical connection includes, but is not limited to, providing connections for a phone or modem, media or multimedia connections, or fiber optic connections for any applicable purpose. While the contacts 85 shown in the preferred embodiment are located on the projections 82, other connection locations (along the trim portion 28, side wall 30, or interface surface 26) can be included and may be integrated into the module and module receiver as desired. For example, a "docking station" connection may be integrated into a module receiver for a particular vehicle application where the percentage use of a module containing a lap top computer would be significant.

With particular reference to FIGS. 10–12, module 80 is shown to include a module interface surface 86 coordinated with and generally complementary to receiver interface surface 26 (FIG. 1). Module walls 88 are also provided on module 80 and generally complement side wall 30 of module receiver 20. As such, an insert portion 90 of module 80 generally coordinates with recess 32 of module receiver 20. Within insert portion 90, formed by module interface surface 86 and module walls 88, is a cavity 92 which allows for the incorporation of a wide variety of features and components contained within cavity 92 or extending beyond cavity 92 and away from module interface surface 86 to provide additional space.

Module 80 is divided into several portions 94 and 96 by divider 98. Portion 94 is covered by a lid 100 hinged along one edge by hinge 102. Lid 100 can be rotated from a closed position where items are secured within portion 94 to an open position where items can be placed in or retrieved from portion 94. Portion 96 of module 80 is an open segment including a cup holder 104. Cup holder 104 can be used in the orientation shown in FIG. 10 when module 80 is installed in the module receiver 20 and rotated as shown in FIG. 2, or as shown in FIG. 12 can be rotated about hinge 106 and locked in position thereby allowing cup holder 104 to be used when the module receiver 20 is in the orientation shown in FIG. 1. Typically, in the folded down position the occupant sitting adjacent the module would utilize the cup holder, while in the up position the occupant seated rearward of the module would use the cup holder. As shown, some features within the interchangeable modules are intended to be utilized when the module receiver is in either a generally horizontal position or an upward generally vertical position.

Figure 13:
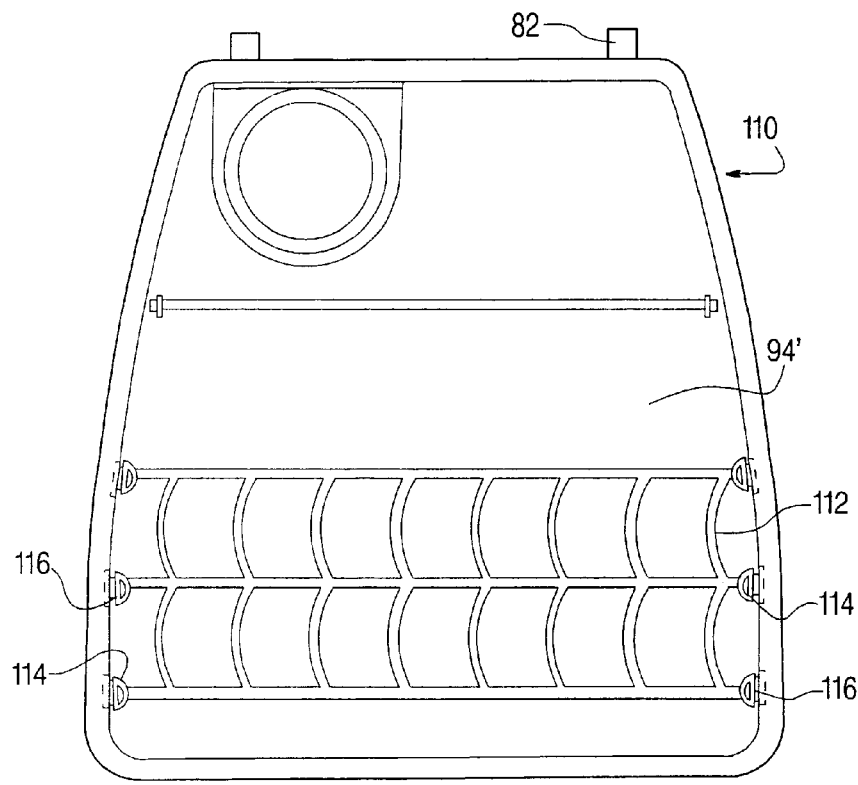
FIG. 13 is a plan view of a module made in accordance with the teachings of the present invention.

Referring to FIG. 13, a module 110 is shown which is similar to module 80 of FIG. 10 but includes a net or mesh panel 112 used to retain items in portion 94'. Similar to lid 100, panel 112 allows the user to secure its in portion 94' in either a generally horizontal position or a substantially vertical position. Further, panel 112 can be removed by disengaging fasteners 114 from the attachment points 116 along module wall 88.

Figure 14:
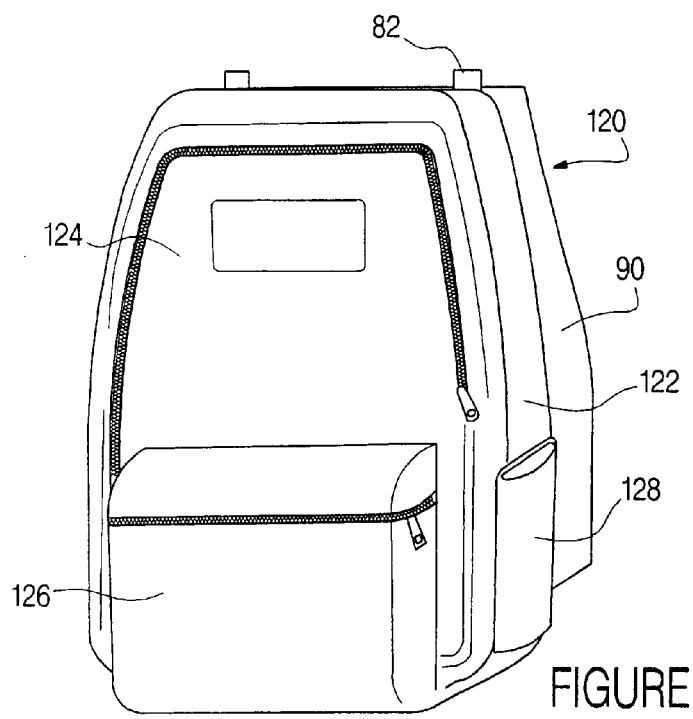
FIG. 14 is a perspective view of a backpack module of the present invention.

Referring to FIG. 14, a tote bag module 120 is shown which allows the user to conveniently and securely store the tote bag in the vehicle, as well as quickly remove the tote bag and use it outside of the vehicle. Module 120 is generally constructed of an insert portion 90 and a bag portion 122. In a preferred embodiment, insert portion 90 of module 120 remains as an integral part of the tote bag module 120 when removed from a module receiver 20. The insert portion 90 can be covered with material similar to or the same as the bag portion 122 of module 120 or can be left uncovered. Straps or handles (not shown) can be provided for convenient transport of the module 120 when used away from the vehicle. In the present embodiment, module 120 includes multiple compartments 124, 126, and 128. Depending upon the particular use of the tote bag module 120, one or more of the compartments can be lined with a water proof or water resistant lining for carrying wet items or an insulated lining for keeping food hot or cold. Further, large compartment 124 can include a separate compartment therein which is designed to secure a laptop computer within the protected confines of insert portion 90. The additional structure provided by portion 90 can provide added protection from damage which may be caused by carrying a computer in a less ridged environment.

In a modified embodiment, a zipper or other connecting device can be incorporated between tote bag portion 122 and insert portion 90. This modified embodiment would allow the user to either leave portion 90 connected to bag portion 122 and have a larger bag, or remove portion 90 and have a lighter weight smaller bag.

Figure 15:
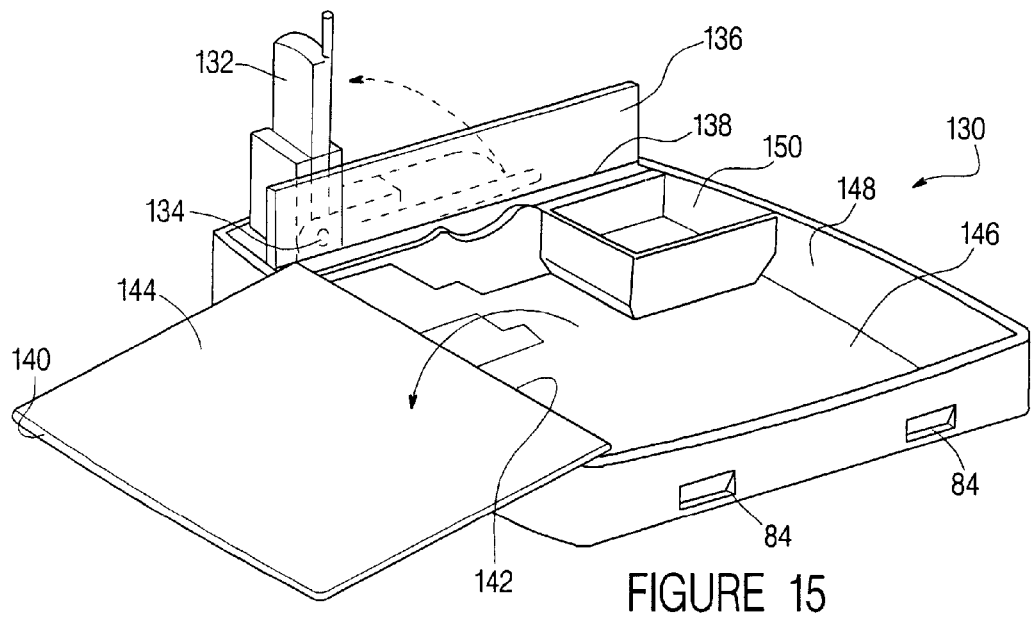
FIG. 15 are a perspective, plan, rear, and side view of a mobile office module made in accordance with the teachings of the present invention.

Referring to FIG. 15, a mobile office module 130 is shown. The module 130 provides convenient storage for many items required to conduct business while in a vehicle. The module 130 includes a phone cradle 132 which can be rotated about pivot axis 134 from a stored position (shown in phantom) to an in use position as shown. As previously described, electrical and communication connections are provided between module 130 and module receiver 20 which allow the phone to charge and be connected to a hands free speaker and microphone while placed in the cradle 132. Further, connection to an auxiliary antenna (not shown) mounted on the vehicle can also be achieved. When rotated to the stored position, a cover 136 conceals and protects the phone. The cover 136 is pivots about a hinge 138 and can be secured in a closed position by a latching device as known in the industry. The cover 136 can be opened while the module is in a generally horizontal position as shown, or when the module is generally vertical. For example, if the module 130 where placed in the module receiver 20 shown in FIG. 1, the vehicle occupant seated next to the seat back incorporating the module 130 could easily reach and open the cover 136 and pivot the phone cradle 132 to provide convenient access to the phone.

Figure 15A:
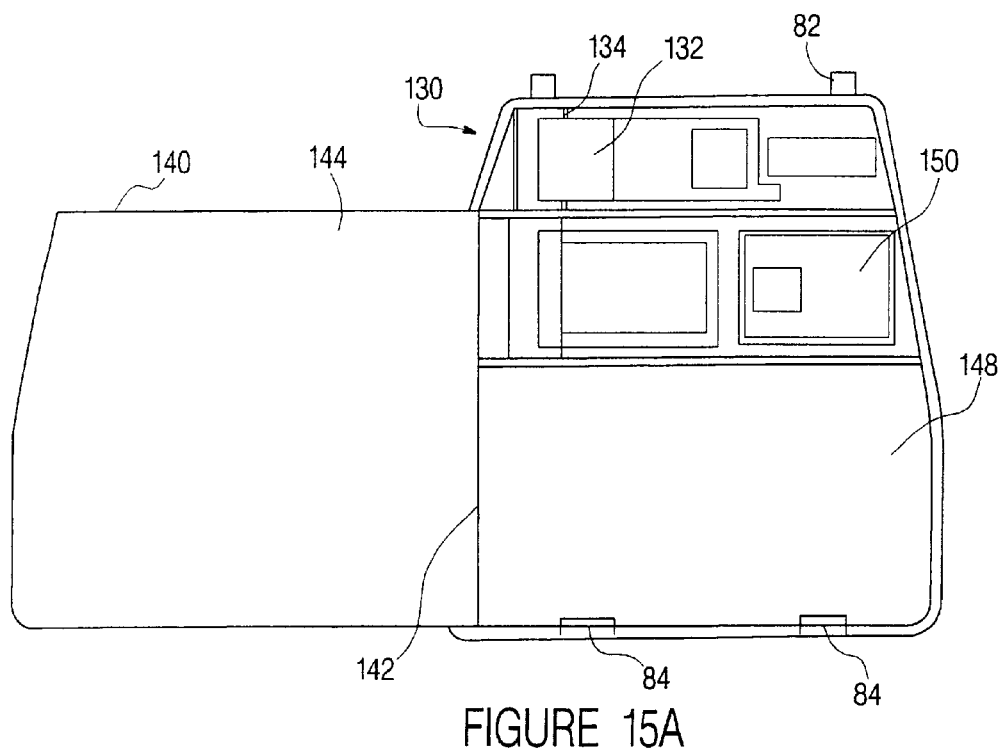
Figure 15B:
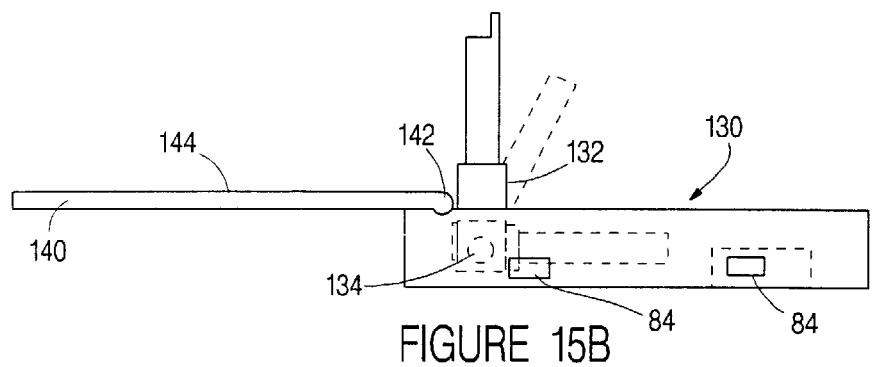
Figure 15C:
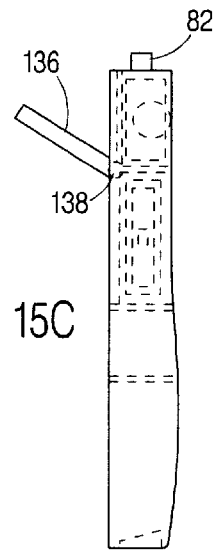

Writing surface 140 is rotatable above a hinge 142 to provide a solid work surface 144 for use by the vehicle occupant. Further, surface 140 acts as a lid to cover and secure other items, such as a lap top computer, electronic organizer, or note book, within compartment 146. As shown, compartment 146 is divided into multiple compartments 148 and 150. A flexible storage system can be included for dividing compartment 146 into custom made compartments by the user by incorporating a grid system of upstanding supports (not shown) along an inner surface of module walls 88. Dividers of varying lengths would enable the user to form specialized compartments to meet the particular needs of the user. Compartment 150, as shown in FIG. 15A, includes a DC to AC converter 152 which allows an occupant to use any conventional appliance powered by a 120 volt AC current. Other currents and connector patterns can be incorporated depending upon the standard within the country where the module or vehicle is sold or utilized.

Figure 16:
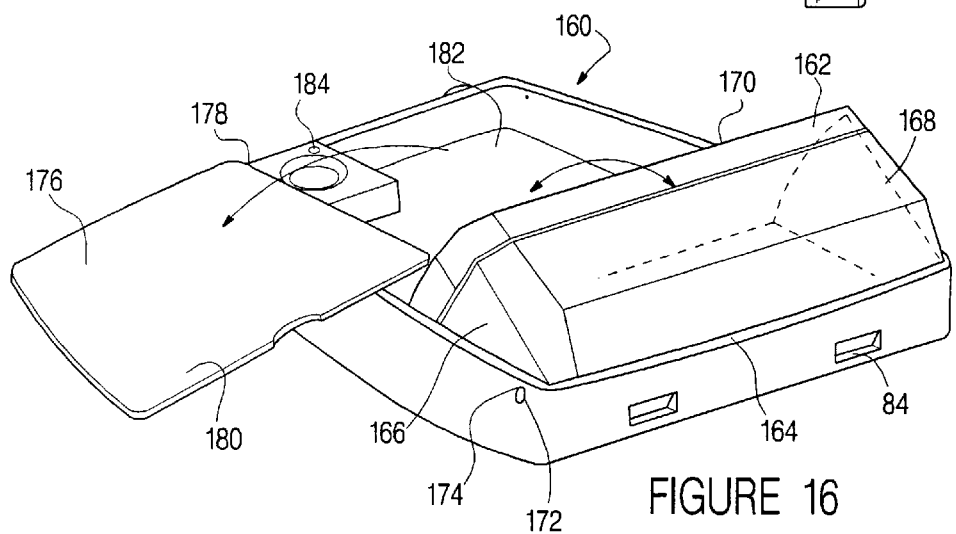
FIG. 16 is a perspective view of a commuter oriented module of the present invention.

Referring to FIG. 16, a commuter module 160 is shown. The commuter module 160 provides a pivoting bin 162 which can be used to store trash or other items. The bin 162 pivots about one edge 164 and has side panels 166, as well as, face panel 168 and back panel 170. The bin 162 can be hinged along edge 164 or can pivot about pins 172 formed in side panels 166 which engage holes 174 formed in module walls 88. Preferably, bin 162 is removable for ease of emptying and cleaning if required. The formation of bin 162 allows for use when module 160 is in a generally horizontal position or in a substantially vertical position. Reference FIGS. 1 and 2 as previously noted.

The module 160 further includes a rotatable cover 176 which, when pivoted about hinge 178, provides a surface 180 to support a pad of paper or food items. The cover 176 can be rotated to a closed position (not shown) and used to secure items within a compartment 182. Mounted within compartment 182 is a cup warmer 184 which is electrically heated to keep a beverage warm. The electrical connections previously described are incorporated in the module 160 to provide electricity to cup warmer 184. With reference to FIG. 17, a brief case support module 190 is shown. The module 190 includes a first support platform 192 having a fixed retention shoulder 194 and an adjustable retention shoulder 196 located in opposition thereto. Adjustable retention shoulder 196 can be spring biased to securely retain an object, such as a brief case, between shoulders 194 and 196. Further, platform 192 includes a rear retention shoulder 198 located and oriented substantially perpendicular to shoulders 194 and 196. The module 190 also includes a second support platform 200 having a rotatable retention shoulder 202 mounted therein. The rotatable retention shoulder 202 is rotatable about pivot axis 204 which allows shoulder 202 to be moved to an upstanding position generally parallel to and opposite from rear retention shoulder 198. Shoulder 202 can be spring biased to the upstanding position or an be manually movable to such a position. The four shoulders 194, 196, 198, and 202, provide for secure retention of a briefcase or other object placed on support platforms 192 and 200. First support platform 192 is rotatable about a pivot axis 204 and can rotate from a first position (not shown) substantially overlaying second support platform 200, to a second position approximately 180 degrees from the first position and substantially coplanar with second support platform 200. Second support platform 200 can also be rotated to an open position (when not supporting an object) thereby allowing access to a compartment 206 located there below. A latch mechanism 208 is used to secure both platforms 192 and 200 in a closed position, selectively release platform 192, or release both platforms 192 and 200.

The module 190 further includes a rotatable support surface 210 which rotates about pivot axis 212 and includes a clip 214 to secure a piece of paper or a notepad. Surface 210 also acts as a cover for a compartment 216 which is either discrete from or a part of compartment 206. Surface 210 is secured in a closed position by a separate latch 218 of latch mechanism 208.

Figure 18A:
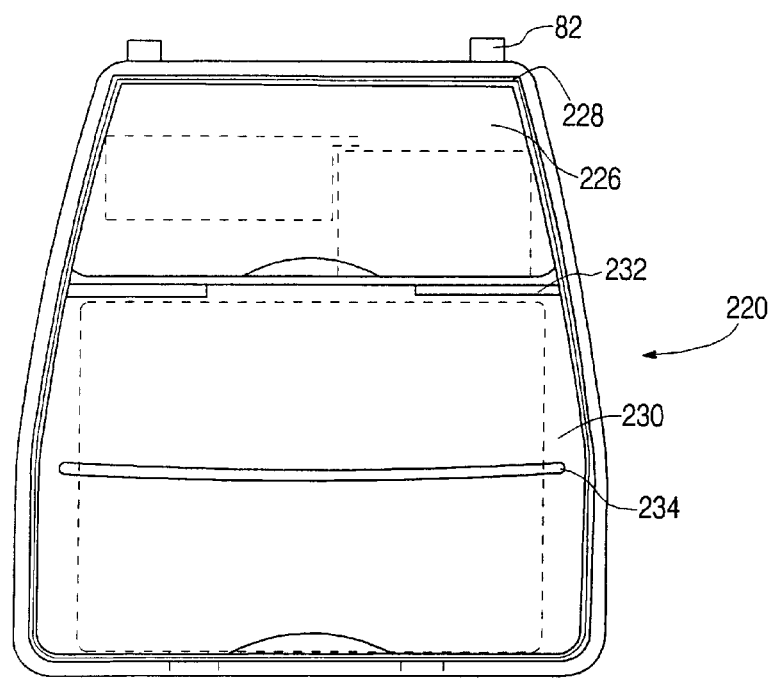
FIG. 18 are a plan, rear, and side view of an elevated support module made in accordance with the teachings of the present invention.
Figure 18B:
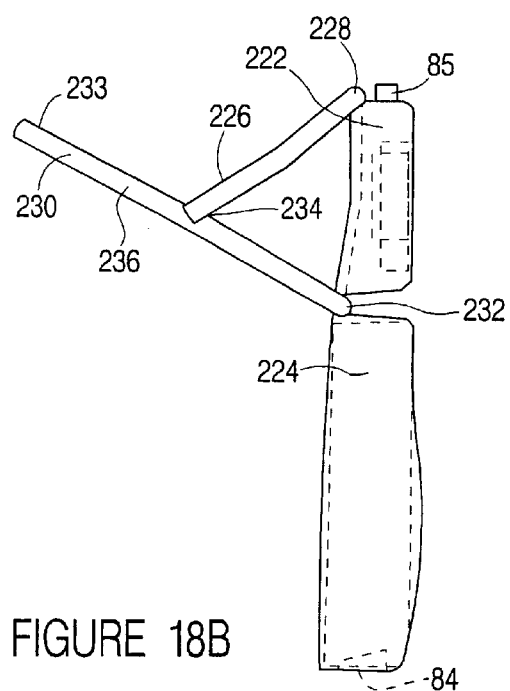

Referring to FIG. 18, an elevated support module 220 is shown. The support module 220 includes two compartments 222 and 224. The first compartment 222 is covered by a panel 226 which conceals and retains items with the compartment when closed. The panel 226 rotates about a forward edge 228 as shown. The second compartment 224 is covered by a surface 230 rotatable about a forward edge 232. Surface 230 also conceals and retains items within the compartment 224. A first side 233 of surface 230 provides a depression or groove 234 generally parallel to and offset from forward edge 232. When rotated to an over center upright position, surface 230 is supported by panel 226 which nests with and engages groove 234. As such, an inclined support surface is formed which can be used to support a book, or can allow for a lap top computer screen to be rotated to an open and usable position. Further, an LCD or flat screen display can be incorporated in or attached to the second side 236 of surface 230. By incorporating electrical contacts 85 in projections 82, electricity and multimedia information can be supplied from the vehicle wiring to the display.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

We claim:

1. A seat assembly of a vehicle capable of receiving and retaining an interchangeable module, said seat assembly comprising:

a seat bottom;

a seat back extending generally upward from said seat bottom; and a module receiver secured to one end of said seat bottom and seat back, said module receiver including at least one electrical contact and having a first portion of a retention mechanism for releasably retaining a module for use by a vehicle occupant when the module is received and retained in said module receiver, said first portion of said retention mechanism including an aperture for receiving a projection on the module and a selectively releasable latch member coordinated with said aperture to retain the module by engaging a portion thereof.

2. The seat assembly of claim 1 wherein said module receiver is located on said seat back.

3. The seat assembly of claim 2 wherein said seat back includes a first surface for supporting an occupant when seated and a second surface generally opposite said first surface, said module receiver being disposed on said second surface of said seat back.

4. The seat assembly of claim 1 wherein said module receiver is located on said seat bottom.

5. The seat assembly of claim 4 wherein said seat bottom includes a first surface for supporting an occupant when seated, said module receiver being disposed on said first surface of said seat bottom.

6. The seat assembly of claim 1 wherein one of said seat bottom and said seat back includes a first surface for supporting an occupant when seated and a second surface generally opposite said first surface, said module receiver further including a receiver interface surface for interfacing with the module, said receiver interface surface being offset from one of said first and second surfaces of said seat.

7. The seat assembly of claim 6 wherein said receiver interface surface is offset from one of said first and second surfaces toward the other of said first and second surfaces.

8. The seat assembly of claim 1 further comprising a module having a second portion of said retention mechanism, said module being coordinated with and received by said module receiver, said module being retained in said module receiver by engagement between said first portion and said second portion of said retention mechanism.

9. The seat assembly of claim 8 wherein said retention mechanism includes a latch member on said module, said module latch member being operatively coordinated with said module receiver latch member.

10. The seat assembly of claim 8 wherein said second portion of said retention mechanism is a formation for selective engage with said first portion of said retention mechanism.

11. The seat assembly of claim 1 wherein said module receiver includes a side wall, said side wall being positioned opposite said aperture, said latch member being located on said side.

12. The seat assembly of claim 1 wherein said at least one electrical contact includes coordinated electrical contacts.

13. A seat assembly for a vehicle, said seat assembly comprising:
- a seat back having a first surface for supporting a seat occupant when in a seated position and a second surface, said seat back including at least one electrical contact; and
- a module receiver secured to said seat and engaging said second surface of said seat back, said module receiver having a coupling device for releasably retaining a module for use by a vehicle occupant when the module is received and retained in said module receiver, said coupling device including an aperture for receiving a projection on the module and a selectively releasable latch member coordinated with said aperture to retain the module by engaging a portion thereof.

14. The seat assembly of claim 13 wherein said seat back is rotatable about a pivot axis from a generally upright seating position to a substantially horizontal module use position.

15. The seat assembly of claim 13 wherein said module receiver further comprises:
- a receiver interface surface offset from said second surface of said seat back;
- a peripheral trim portion being substantially coincident with said second surface of said seat back; and
- a side wall extending between said receiver interface surface and said trim portion.

16. The seat assembly of claim 15 wherein said aperture is positioned on said side wall.

17. The seat assembly of claim 16 wherein said latch member is located on said side wall opposite said aperture.

18. The seat assembly of claim 13 further comprising a module coordinated to be received by said module receiver, and retained by said coupling device of said module receiver.

19. The seat assembly of claim 13 wherein said at least one electrical contact includes coordinated electrical contacts.

20. The seat assembly of claim 19 further comprising a module having electrical contacts aligned with said coordinated electrical contacts, said module being received by said module receiver and retained by said coupling device of said module receiver.

21. The seat assembly of claim 20 wherein said module further includes a projection having said electrical contacts disposed thereon, said projection being coordinated with and engaging said aperture when said module is received by said module receiver, wherein said coordinated electrical contacts are aligned with said aperture thereby providing electrical communication between said module and said coordinated electrical contacts.

22. A seat assembly of a vehicle capable of receiving and retaining an interchangeable module, said seat assembly comprising:
- a seat bottom having a generally horizontal seating surface;
- a seat back extending generally upward from said seat bottom; and
- a module receiver secured to said seating surface of said seat bottom, said module receiver being disposed on and forming at least a portion of said seating surface, said module receiver including a first portion of a retention mechanism for releasably retaining a module for use by a vehicle occupant when the module is received and retained in said module receiver, said first portion of said retention mechanism comprising an aperture for receiving a projection on the module and a selectively releasable latch member coordinated with said aperture to retain the module by engaging a portion thereof.

23. The seat assembly of claim 22 wherein said module receiver includes a side wall, said side wall being positioned opposite said aperture, said latch member being located on said side wall.

24. A seat assembly of a vehicle capable of receiving and retaining an interchangeable module, said seat assembly comprising:
- a seat bottom having a generally horizontal seating surface;
- a seat back extending generally upward from said seat bottom;
- a module receiver secured to one of said seat bottom and said seat back; and
- at least a first module and a second module, each of said at least first module and said second module being coordinated with and releasably received by said module receiver whereby each of said at least first module and said second module is interchangeable with said module receiver, said first module providing a first function and said second module providing a second function, said at least first module and said second module being selected from a group consisting of a seating surface module, a base module, a mesh panel module, a tote bag module, a mobile office module, a commuter module, a brief case support module, and an elevated support module.

25. A seat assembly of a vehicle capable of receiving and retaining an interchangeable module, said seat assembly comprising:
- a seat bottom;
- a seat back extending generally upward from said seat bottom; and
- a module receiver secured to one of said seat bottom and seat back, said module receiver having a first portion of a retention mechanism for releasably retaining a module for use by a vehicle occupant when the module is received and retained in said module receiver, said first portion of said retention mechanism including an aperture for receiving a projection on the module and a selectively releasable latch member coordinated with said aperture to retain the module by engaging a portion thereof, said one of said seat bottom and seat back to which said module receiver is secured includes coordinated electrical contacts.

* * * * *

UNITED STATES PATENT AND TRADEMARK OFFICE
CERTIFICATE OF CORRECTION

PATENT NO. : 6,199,948 B1
DATED : March 13, 2001
INVENTOR(S) : Bush et al.

It is certified that error appears in the above-identified patent and that said Letters Patent is hereby corrected as shown below:

Originally numbered claims 9-11 were omitted by the U.S. Patent and Trademark Office from the issued patent. The issued patent should have a total of twenty-eight (28) claims. Accordingly, originally numbered claims 9-11 should have issued along with all of the other claims.

Column 8,
Claim is as follows:
   10.   The seat assembly of Claim 9 further comprising a module having a second portion of said retention mechanism, and having electrical contacts aligned with said coordinated electrical contacts, said module being coordinated with and received by said module receiver said module being retained to said module receiver by engagement between said first portion and said second portion of said retention mechanism.

Signed and Sealed this

Eleventh Day of December, 2001

Attest:

NICHOLAS P. GODICI
Attesting Officer   Acting Director of the United States Patent and Trademark Office